United States Patent Office 3,469,338
Patented Sept. 30, 1969

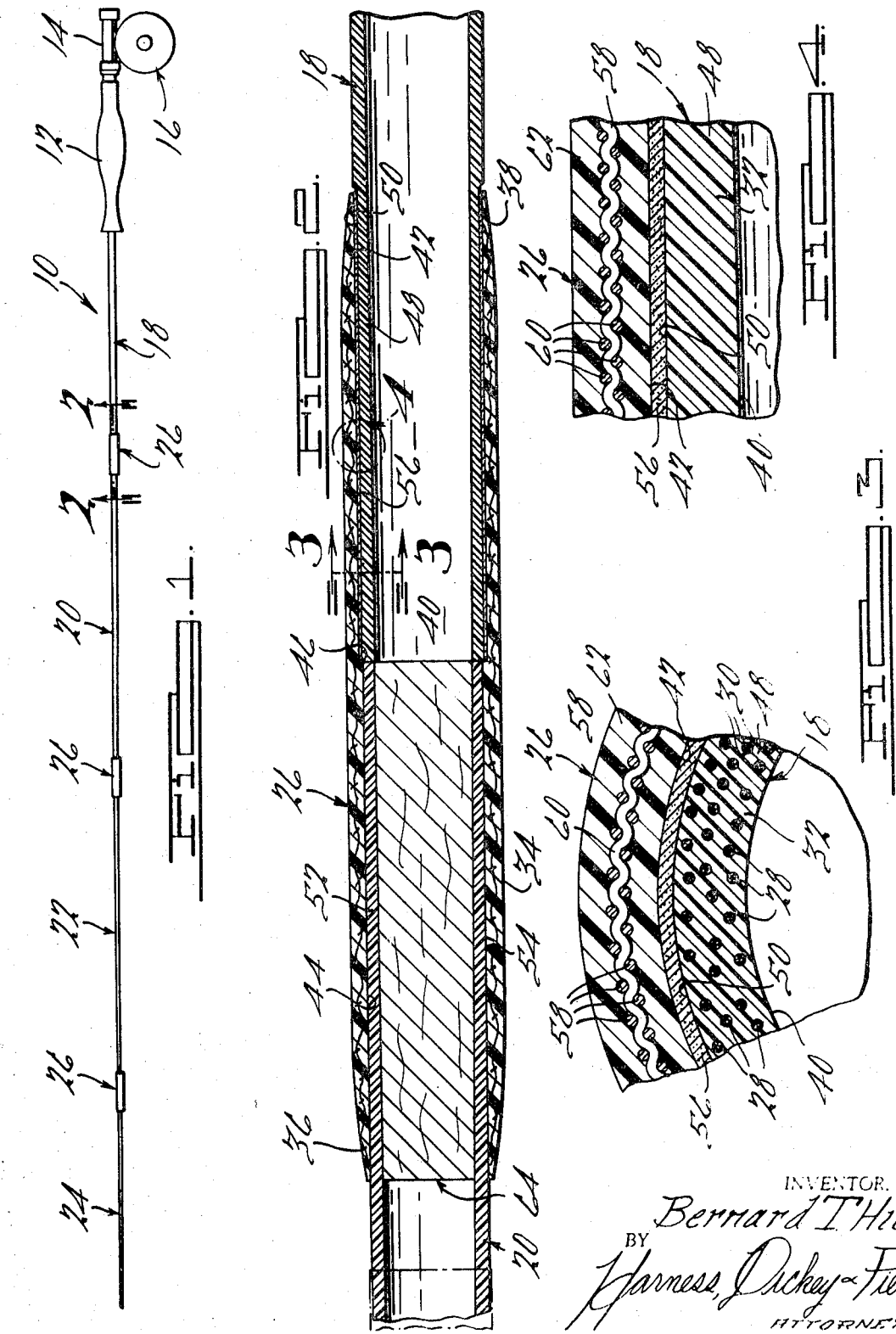

3,469,338
FISHING ROD
Bernard T. Hills, Cassopolis, Mich., assignor to Victor Comptometer Corporation, Chicago, Ill., a corporation of Illinois
Filed Jan. 25, 1968, Ser. No. 700,572
Int. Cl. A01k 87/02
U.S. Cl. 43—18
12 Claims

ABSTRACT OF THE DISCLOSURE

A multi-section fishing rod comprising a plurality of elongated and substantially cylindrical fiber glass rod sections, and ferrule means for detachably securing the adjacent ends of the rod section together in a manner such that the rod sections are disposed in substantial coaxial alignment; each of the ferrule means having a first bore portion adapted to telescopically and frictionally engage one end portion of one of the rod sections and a second bore portion adapted to telescopically receive one end portion of another of the rod sections; each of the ferrule means also comprising a plurality of reinforcing fibers embedded in a resinous bonding agent, with at least some of the fibers extending in one direction relative to the longitudinal axis of the fishing rod and other fibers extending in a direction different from the direction of the first mentioned fibers, whereby to provide for multi-directional reinforcement of the ferrule means and associated rod sections against splitting or cracking during normal flexing action of the rod.

Background of the invention

Although fishing rods, particularly those of the fly casting type, were originally fabricated of a plurality of strips of bamboo or a similar wood material that were glued together in a manner so as to provide a generally multi-sided, tapered construction, within the past few years, reinforced fiber glass fishing rods have become more and more popular and, to a great extent, have substantially replaced fishing rods previously fabricated of bamboo and the like. Such fiber glass fishing rods are most frequently fabricated of a polymerized resin in which a plurality of reinforcing strands of unitary glass fibers are embedded in side-by-side longitudinal relationship.

One of the major problems encountered in transporting fishing rods of the fly casting type resides in the fact that such rods, as well as most other types of fishing rods, are usually of considerable length, thereby necessitating the use of some means to permit the rods to be easily dismantled for transit and, thereafter, reassembled for use. It is heretofore been the practice in both bamboo and fiber glass fishing rods to provide some type of metallic connecting means at certain longitudinal locations along the fishing rods to provide for telescopic or similar type engagement between the various sections of the fishing rods. Such connecting means have become known as ferrules and, although they have provided for the most part effortless assembly and disassembly of the rod sections without the use of any special tools or the like, such ferrules have been objectionable due to the expenses involved in their manufacture and assembly on the fishing rods, as well as the frequently recurring problem of corrosion which prevents or at best severely resists, effortless assembly and disassembly of the rod sections.

In order to overcome the aforementioned objectionable characteristics of metallic ferrules, as applied to fiber glass fishing rods, it has heretofore been proposed to directly telescopically engage the abutting sections of a fishing rod, whereby, for example, the forward end of one rod section is telescopically received within a counterbore formed in the rearward end of the adjacent rod section. Although this basic concept has been considered to be a definite advance in the art in obviating certain problems heretofore created as a result of the use of metallic ferrules, such a construction has the shortcoming of requiring some type of reinforcing means provided around the outer periphery of the rod section within which the counterbore is formed. The reason for this resides in the fact that the fibers of the rod sections extend longitudinally thereof, and thus the ends of the telescopically engaged rod sections are subjected to severe stresses and frequently become split or otherwise damaged upon normal flexing action of the fishing rods, thus rendering the rods inoperable.

In United States Patent No. 3,186,122, issued June 1, 1965, for Sectional Fly Casting Rod, a fishing rod construction is disclosed which attempts to solve the aforementioned problem through the provision of an elongated reinforcing member that is wound around the outer periphery of one of the rod sections, which reinforcing member is also utilized to secure the fishing rod line guides to the rod sections; however, the patented construction is undesirable from the standpoint that a great number of manufacturing operations are required, as well as from the inherent disadvantage that the line guides must be located directly adjacent the telescopic joints of the various rod sections. Moreover, in the event the reinforcing member which is wound around the ends of the rod sections becomes worn or is in some other way damaged, the fishing rod becomes extremely susceptible to the aforementioned splitting or similar injury.

In accordance with the principles of the present invention, a new and improved multi-section fiber glass fishing rod is provided which is intended to overcome the disadvantages heretofore encountered with metallic fishing rod ferrules, as well as those disadvantages attendant fishing rods of the type shown and described in the aforementioned patent. The improvements of the present invention are achieved through the provision of a novel ferrule member which is of a generally cylindrical construction having first and second bore portions adapted to telescopically receive the adjacent ends of a pair of associated fishing rod sections. The ferrule member is fabricated of a plurality of reinforcing fibers which are preferably, although not necessarily, glass fibers, and are embedded in a resinous bonding agent such as a phenolic or polyester resin. The glass fibers are arranged such that at least a certain number thereof extend substantially parallel to the longitudinal axis of the fishing rod, while others extend at substantially right angles with respect to the axis of the rod. Such a construction provides for strength in multiple directions rather than in a single direction as is the case with the uni-directionally oriented fibers of the rod itself. In a preferred construction of the present invention, the bonding agent within which the glass fibers of the ferrule are embedded is of the same material incorporated in the fishing rod itself, with the result that the ferrule is adapted to flex with the rod, preserving the "one-piece" or continuous flexing action that is highly desired in fishing rods. A further feature of the present invention resides in the fact that the ferrule construction is readily adaptable to various sizes and kinds of fishing rods and may be made of a contour so as to blend smoothly with the shape of the fishing rod itself, thus not detracting from the aesthetic appearance of the rod.

Summary of the invention

This invention relates generally to fishing rods and, more particularly, to a new and improved multi-section fishing rod.

It is a general object of the present invention to provide a new and improved fishing rod of the above type which incorporates a novel ferrule construction for detachably connecting the various rod sections thereof together.

It is a more particular object of the present invention to provide a ferrule construction of the above described type which is fabricated of a plurality of reinforcing fibers that are arranged so as to provide for multi-directional strength at the locations where the rod sections are joined together.

It is another object of the present invention to provide a ferrule construction of the above described type which is pleasant in appearance and may be economically manufactured.

It is yet another object of the present invention to provide a ferrule for a multi-section fishing rod which is adapted to preserve the "one-piece" flexibility of a fishing rod and is adapted to have a long and durable operational life.

Other objects and advantages of the present invention will become apparent from the following detailed description taken in conjunction with the accompanying drawing.

Brief description of the drawing

FIGURE 1 is a side elevational view of a conventional fishing rod of the fly casting type having the improvements of the present invention in operative association therewith;

FIGURE 2 is an enlarged longitudinal cross-sectional view taken substantially along the line 2—2 of FIGURE 1;

FIGURE 3 is an enlarged fragmentary transverse cross-sectional view taken substantially along the line 3—3 of FIGURE 2, and FIGURE 4 is an enlarged fragmentary view of a portion of the rod structure illustrated in FIGURE 2, as taken within the circle 4 thereof.

Detailed description of the preferred embodiment

For purposes of clarity of description, the terms "forwardly," "rearwardly" and derivatives thereof will have reference to the forward and rearward ends of the fishing rod illustrated in FIGURE 1, with the forward end of said rod being located at the left side of this figure and the rearward end being located at the right side thereof. Likewise, the terms "inwardly" and "outwardly" will have reference to the geometric center of the various components of the fishing rod of the present invention, as shown in FIGURE 1.

Referring now to the drawings, a fishing rod 10, for example, of the fly casting type, is shown as comprising an elongated handle 12 having a fishing reel mounting portion 14 extending rearwardly therefrom and adapted to support a conventional fishing reel 16 thereon. The fishing rod 10 also comprises a plurality of generally tubular, forwardly tapered rod sections 18, 20, 22 and 24, the former of which is fixedly secured to the forward end of the rod handle 12, and all of which are connected in the manner illustrated by a plurality of substantially identical ferrule members, generally designated 26, which are constructed in accordance with the principles of the present invention and one of which will hereinafter be described in detail. As illustrated in FIGURES 2 through 4, the rod sections 18–24 of the fishing rod 10 are each formed with a plurality of longitudinally extending strands, generally designated 28, each of which comprises a number of unitary glass fibers 30. The strands 28 are disposed in side-by-side relationship, i.e., are arranged unidirectionally along the longitudinal axis of the rod 10, and are embedded in a matrix of a suitable bonding material such as a polymerized resin 32 which may be of any one of the types of resins commercially available.

As best illustrated in FIGURE 2, the ferrule member 26 of the present invention is of a generally tubular configuration having an outer surface 34 that tapers gradually radially inwardly toward the longitudinally opposite ends thereof, as seen at 36 and 38. The member 26 is formed with a central, longitudinally extending bore, generally designated 40, which is defined by first and second, cylindrical and coaxially arranged bore portions 42 and 44 that are adapted to have the forward end of the rod section 18 and the rearward end of the rod section 20, respectively, telescopically received therewithin for securing said rod sections in substantial coaxial alignment. It will be apparent, of course, that the ferrule members 26 associated with the rod sections 22 and 24 are adapted to function in exactly the same manner as the member 26 associated with the rod sections 18, 20 so that the instant description is equally applicable to each of the ferrule members 26 incorporated in the fishing rod 10.

As illustrated in FIGURE 2, the inner diameter of the bore portion 42 is slightly larger in size than the bore portion 44, with the result that a radially inwardly extending shoulder 46 is defined at the juncture of the bore portions 42, 44. In order to provide for smooth telescopic engagement of the forward end of the rod section 18 within the bore portion 42, the outer periphery of said forward end, hereinafter identified at 48, has the outer periphery thereof grounded or otherwise formed so as to provide a uniform diameter cylindrical surface 50 thereon. Similarly, the rearward end portion of the rod section 20, shown at 52, has the outer periphery thereof grounded or otherwise formed with a uniform diameter cylindrical surface 54 so as to be adapted to smoothly, yet frictionally engage the inner periphery of the bore portion 44 when the end portion 52 of the rod section 20 is telescopically received therewithin. In a preferred construction of the present invention, the ferrule member 26 is fixedly secured to one or the other of the rod sections 18, 20, and in the embodiment of the present invention shown herein, the ferrule 26 is shown as being fixedly secured to the end portion 48 of the rod section 18. Means for thus securing the ferrule 26 to the rod section 18 may be provided by any suitable glue, adhesive or the like, as shown at 56 in FIGURES 2 through 4. Upon assembly of the ferrule member 26 on the rod section 18, the adhesive 56 is initially placed around the outer periphery of the cylindrical surface 50 and thereafter, the ferrule 26 is surmounted axially onto the rod section 18 and is moved axially rearwardly therealong until the forwardmost end of the rod section 18 abuts against the aforementioned shoulder 46. It will thus be noted that the shoulder 46 functions to properly axially position the ferrule member 26 on the associated rod section 18.

In accordance with the principles of the present invention, the ferrule member 26 generally comprises a plurality of fibers which preferably, although not necessarily, consist of glass fibers that are oriented in a manner so as to assure that a strong, yet flexible connection is provided between the associated rod sections, i.e., between the sections 18 and 20. In order to achieve such a connection, the glass fibers of the ferrule 26 are arranged such that some of said fibers extend in one direction relative to the longitudinal axis of the fishing rod 10, while other of said fibers extend in a direction different from the direction of the first mentioned fibers. More particularly and in accordance with a preferred construction of the present invention, the fibers are arranged in a generally grid-like orientation, with the result that the fibers are arranged at substantially right angles to one another. Such an arrangement of the glass fibers of the ferrule 26 has been found to be most economically and effectively accomplished through the use of a woven fiber glass fabric or cloth of a square weave design wherein, as shown in FIGURES 3 and 4, a certain number of fibers 58 extend longitudinally of the fishing rod 10, while the remaining fibers 60 extend at substantially right angles to the axis of the rod 10, i.e., circumferentially around the rod 10.

The glass fibers 58 and 60 of the ferrule member 26 are designed to be embedded in a suitable resinous bonding agent 62 which functions to impart a certain amount of rigidity to the ferrule 26, yet provides for sufficient flexibility so as to not detract from the desired flexing action of the fishing rod 10. Such a bonding agent may be of any suitable type, such as a phenolic or polyester resin, and preferably, although not necessarily, may be of the same type of bonding agent as the material 32 incorporated in the rod sections 18–24.

An exemplary method of fabricating the ferrule member 26 of the present invention consists of the steps of wrapping a suitable glass cloth or fabric comprising the fibers 58, 60 around a cylindrical mandrel which is of a size commensurate with the particular location at which the ferrule 26 is to be incorporated in the rod 10. The bonding agent 62 is then applied to the cloth and is permitted to cure or harden in a manner well known in the art. Thereafter, the mandrel may be removed from the interior of the ferrule 26 and said ferrule may be cut to length and properly contoured or tapered, as shown at 36 and 38. The interior of the ferrule 26 is then counterbored to provide the bore portions 42 and 44, and preparatory to mounting the ferrule 26 on the associated rod sections, said sections are suitably grounded to provide the necessary cylindrical surfaces, such as the surfaces 50 and 54. The ferrule 26 may be thereafter be glued to an associated rod section, such as the section 18. For certain applications, it will be noted that the rearward end of the forwardmost rod section associated with each of the ferrules 26 may be provided with an interior plug member for purposes of reinforcing the same. Such a plug member is shown in FIGURE 2 in operative association with the rod section 20 and is generally designated by the numeral 64. The plug 64 may be fabricated of any number of materials, but is preferably constructed of a suitable lightweight, easily formed material such as wood or the like.

In operation, it will be seen that the ferrule 26 of the present invention, by virtue of the multi-directional orientation of the fibers 58, 60 thereof, will provide for both radial and axial reinforcement at the joint of the rod sections 18, 20, with the result that the ferrule 26 offers considerable resistance to breaking and splitting of both the rod sections 18, 20 and the ferrule 26 itself. By virtue of the fact that the ferrule 26 is fabricated of glass fibers and a resinous bonding agent which is the same or at least similar to the bonding material incorporated in the rod sections themselves, the ferrule 26 is adapted to flex with the same action as the associated rod sections, thereby preserving the "one-piece" feel and action of the rod 10.

From the foregoing description, the present invention will be seen to exhibit a number of advantages heretofore not present on similar type multi-section fishing rods. For example, the fiber glass and resinous construction of the ferrule 26 will be seen to clearly obviate all corrosion probems heretofore encountered with metallic ferrule constructions. Also, the ferrule 26 will be seen to have considerable aesthetic or eye appeal inasmuch as it may be made to blend or contour smoothly with the taper of the associated fishing rod in a much better fashion than has heretofore been possible with metallic ferrules. Also, the ferrule construction of the present invention will be seen to be much lighter in weight than comparable metal ferrules. Still a further advantage exhibited by the ferrule construction 26 of the present invention will be seen from the fact that the wall thickness thereof may be easily varied to add strength where needed or, conversely, may be reduced pursuant to use on lighter weight or smaller size fishing rods. Furthermore, the ferrule 26 of the present invention will be found to be extremely economical to commercially manufacture, thereby enhancing the economies of mass production.

While it will be apparent that the embodiment illustrated herein is well calculated to fulfill the objects above stated, it will be appreciated that the present invention is susceptible to modification, variation and change.

I claim:
1. In a multi-section fishing rod,
   first and second elongated and substantially cylindrical rod sections, and
   ferrule means for detachably securing one end of said first rod section to one end of said second rod section, whereby said rod sections are disposed in substantial coaxial alignment,
   said ferrule means comprising a plurality of reinforcing fibers embedded in a resinous bonding agent, at least some of said fibers extending in one direction relative to the longitudinal axis of said fishing rod and other of said fibers extending in a direction different from the direction of said first mentioned fibers,
   said ferrule means having a first bore portion adapted to telescopically engage said one end of said first rod section and a second bore portion adapted to telescopically engage said one end of said second rod section.

2. A multi-section fishing rod as set forth in claim 1 wherein said first and second rod sections are fabricated of a fiber glass material.

3. A multi-section fishing rod as set forth in claim 2 wherein the fiber glass material of said rod sections comprises fibers extending uni-directionally therewithin, and wherein at least some of said fibers of said ferrule means extend in a direction other than the direction of said fibers of said rod setcions.

4. A multi-section fishing rod as set forth in claim 1 wherein some of said fibers of said ferrule means are disposed at substantially right angles with respect to other of said fibers of said ferrule means.

5. A multi-section fishing rod as set forth in claim 1 wherein some of said fibers of said ferrule means extend parallel to the longitudinal axis of said fishing rod and other of said fibers of said ferrule means extends substantially at right angles to the longitudinal axis of said fishing rod.

6. A multi-section fishing rod as set forth in claim 1 wherein said bonding agent comprises a polymerized resinous material.

7. A multi-section fishing rod as set forth in claim 3 wherein said fibers of said rod sections are embedded within a polymerized resinous material, and wherein said bonding agent comprises the same material as said polymerized resinous material.

8. A multi-section fishing rod as set forth in claim 1 wherein said second rod section is frictionally received within said second bore portion of said ferrule means.

9. A multi-section fishing rod as set forth in claim 8 which includes an adhesive material for fixedly securing said one end portion of said second rod section in said second bore portion.

10. A multi-section fishing rod as set forth in claim 1 wherein said first and second rod sections are of a generally tapered configuration and wherein said one ends of said rod sections are of substantially cylindrical shape.

11. A multi-section fishing rod as set forth in claim 10 wherein said second bore portion of said ferrule means is formed with an annular shoulder adapted to abut against said one end of said second rod section and thereby orient said ferrule means axially of said second rod section.

12. A multi-section fishing rod as set forth in claim 10 wherein one of said first and second rod sections is of a substantially hollow construction and is provided with internal plug means for reinforcing said one end thereof.

(References on following page)

References Cited

UNITED STATES PATENTS

| | | | |
|---|---|---|---|
| 386,321 | 7/1888 | Horton | 43—18 |
| 2,230,229 | 2/1941 | Benson | 43—18 |
| 2,594,693 | 4/1952 | Smith. | |
| 2,600,629 | 6/1952 | Feierabend | 43—18 X |
| 2,749,643 | 6/1956 | Scott | 43—18 |

ALDRICH F. MEDBERY, Primary Examiner

DANIEL J. LEACH, Assistant Examiner

U.S. Cl. X.R.

287—126